Patented Feb. 6, 1945

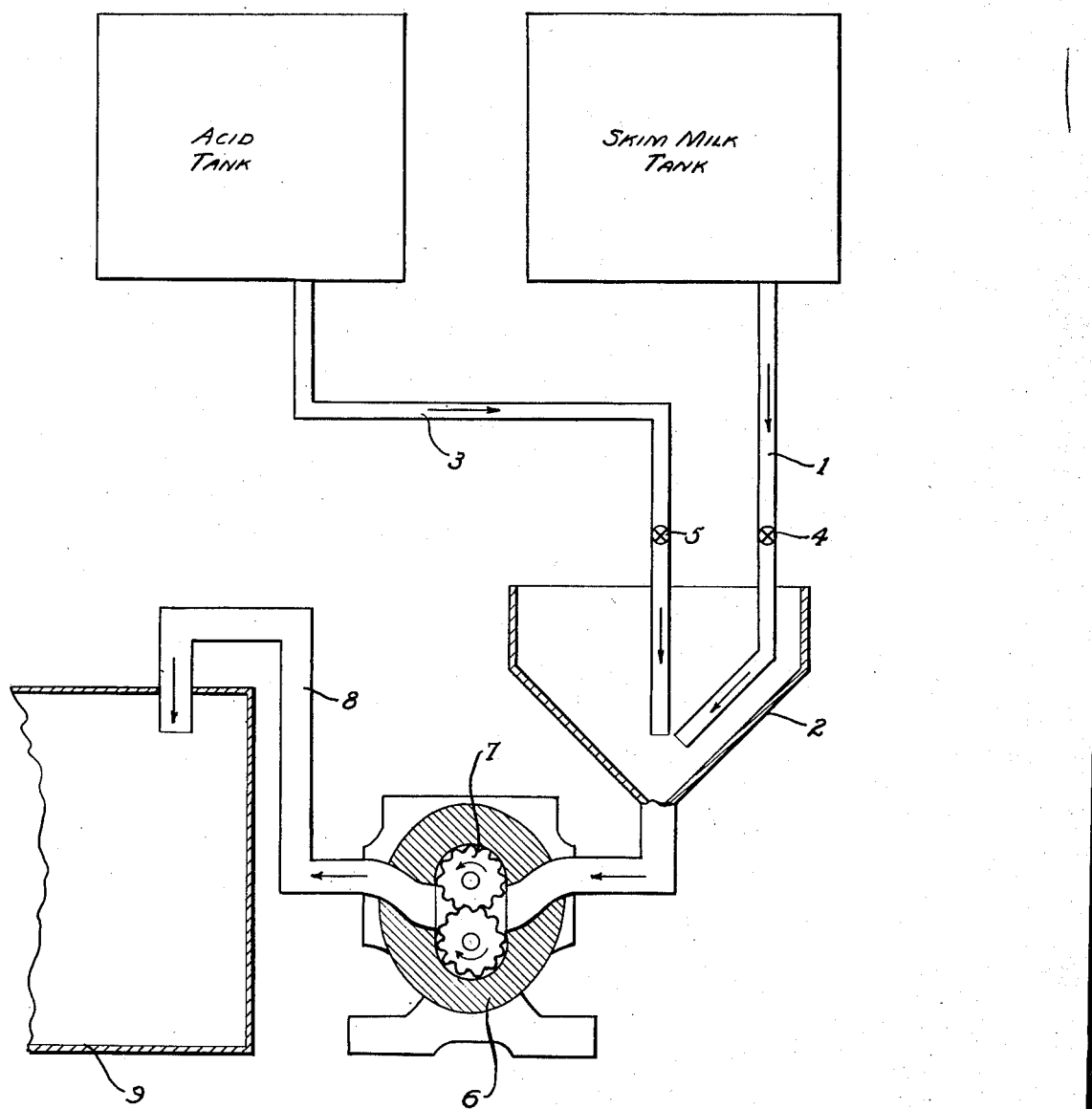

2,369,095

UNITED STATES PATENT OFFICE 2,369,095

PRECIPITATION OF CASEIN

Edward J. Wendt, Elroy, Wis., assignor to Hercules Powder Company, Wilmington, Del., a corporation of Delaware Application November 17, 1942, Serial No. 465,903

3 Claims. (Cl. 260—120)

This invention relates to improved methods for the manufacture of casein and more particularly to a method and apparatus for the production of casein.

It has been the practice in producing casein to heat the milk to a temperature of approximately 120° F. and then to add a dilute solution of an acid such as hydrochloric, sulfuric or lactic acid, in a tank, riffle board, or the like apparatus. The casein is precipitated in the form of a mass of conglomerate particles or lumps. The casein thus formed together with the acid whey is screened or allowed to stand in a tank whereby the casein settles to the bottom and the whey is removed, washed, and dried.

It is highly desirable that the casein curd be low in ash and precipitated in small size particles which are not tough.

It is an object of this invention to provide a method and apparatus which will precipitate the casein thoroughly, in small particles, and with a low ash content.

Another object of the invention is to provide an apparatus by which the precipitation of casein is made economical, simple in operation, and time saving.

Now, in accordance with the present invention, a method and apparatus are used for the precipitation of casein which comprises passing a mixture of acid and skimmed milk or other source of casein through a gear pump in which the acid and milk are thoroughly mixed so that a high quality of casein results.

Having now indicated in a general way the nature and purpose of the invention, there follows a more detailed description of a preferred embodiment thereof with reference to the accompanying drawing in which is illustrated more or less diagrammatically the method and apparatus of the present invention.

As illustrated in the drawing, a skimmed milk supply tank delivers its milk by means of conduit 1 to mixing funnel 2 while an acid supply tank delivers acid to the mixing funnel 2 by means of conduit 3. Valves 4 and 5 on conduits 1 and 3 respectively control the flow of the acid and skimmed milk so that the proper proportions are present in the mixing funnel at all times. The skimmed milk and acid flow immediately into gear pump 6 and are forced around by gears 7—7 and out of the gear pump by means of conduit 8 to a storage or other receptacle 9.

In the preferred method, the preheated skim milk at a temperature of about 90° F. to about 125° F. is introduced into the mixing funnel 2 in the accompanying drawing either by gravity or other means. The milk swirls around the sides of the mixing chamber in rapid manner and passes through the fine film or spray of concentrated acid issuing under pressure from the acid feed line 3. Immediate thorough mixing of the concentrated acid with the milk takes place. With proper setting of the valve 4 in the milk feed line and proper adjustment of the acid regulating valve, the operation may be carried out in a continuous manner with the curd and whey resulting from contact of the acid with the milk separating immediately after leaving the mixing chamber. The curd and whey may then be separated as described above or by other well-known means and the curd washed with water.

In the preferred method, the skimmed milk is held in the storage tank at a temperature of from about 90 to about 140° F. but preferably between about 105 and about 125° F. The acid is of a strength varying between 2.5% and 10% of any of the acids commonly used for precipitating casein such as sulfuric acid or hydrochloric acid and used in sufficient amount to produce a pH preferably between 4.1 and 5.1. Within the funnel 2 a superficial mixing of the skimmed milk and acid takes place. The precipitation of the casein is completed in the gear pump 6 due to the vigorous agitation of the mixture in the pump.

The type of gear pump used can be any of the conventional commercial types such as the Brown & Sharp or Roper, the size of the pump being dependent upon the volume of skimmed milk to be handled.

The following is an example of a method of carrying out the process:

*Example*

One hundred pounds of fresh skimmed milk heated to 110° F. (acidity under 0.20% lactic acid) were mixed with four pounds of a 2.5% solution of sulfuric acid. The mixture was passed immediately through a gear pump, where the curd was precipitated. The casein curd was allowed to separate from the whey in a storage tank, the casein washed in three washings of cold water, pressed and dried at a temperature of 140° F. The ash content was about 20% lower than a sample produced on a riffle board instead of a gear pump, the viscosity was higher, there was lower free acid and the particles were smaller and more tender.

While the use of acid and skimmed milk from tanks has been described, it will be seen that they could be transported from any container by any conventional means to the funnel. Also, the skimmed milk can be heated to the proper temperature by any of the conventional methods such as a jacketed vessel, by injecting live steam into the skimmed milk contained in a pipe line or a tank, or by the use of a heat exchanger.

The gear pump is particularly advantageous and gives desirable results because it gives a very thorough mixing of the acid and skimmed milk almost immediately after the acid and skimmed milk come into contact with each other, and the precipitated curd tends to conform to the shape of the space between the teeth of the gears in the pump with the result that the curd is discharged from the pump in small firm lumps of approximately uniform size and shape which can easily be separated from the whey. The curd and whey can then be discharged into a storage container where the whey can be drained off by conventional means or they may be passed to a separator where they may be separated continuously.

While the invention has been described as applied to casein precipitation, it could also be applied to other protein precipitation where the problems are similar, such as soybean protein or cheese.

The particular advantages of breaking up the curd into small lumps are for better separation of the whey from the curd and better washing of the curd after separation of the curd from the whey, with the result that a better quality casein is produced than could be produced with a riffle board or baffle box which produces curd in large lumps which tend to occlude the whey and makes washing difficult. The method of the present invention gives a more desirable result in a fast and economical manner.

What I claim and desire to protect by Letters Patent is:

1. A method for forming small tender particles of precipitated casein comprising heating skimmed milk to a temperature between about 105° F. and about 125° F., mixing said skimmed milk with a dilute solution of from about 2.5% to about 10% of sulfuric acid in an amount sufficient to produce a pH of between 4.1 and 5.1, immediately passing said mixture through a gear pump, draining off the whey from said casein, and drying the casein.

2. A method for forming small tender particles of precipitated casein comprising heating skimmed milk to a temperature between about 105° F. and about 125° F., mixing said skimmed milk with a dilute solution of from about 2.5% to about 10% of hydrochloric acid in an amount sufficient to produce a pH of between 4.1 and 5.1, immediately passing said mixture through a gear pump, draining off the whey from said casein, and drying the casein.

3. A method of precipitating casein from skimmed milk which comprises heating said skimmed milk from about 90° to about 140° F., mixing said skimmed milk with a dilute solution of from about 2.5% to about 10% of an acid selected from the group consisting of surfuric, hydrochloric, and lactic in an amount sufficient to produce a pH of between 4.1 and 5.1 and immediately passing said mixture through a gear pump, draining off the whey from said casein, and drying the casein.

EDWARD J. WENDT.